United States Patent Office 3,418,380
Patented Dec. 24, 1968

3,418,380
TRANSALKYLATION OF CERTAIN
POLY-TERT-BUTYLPHENOLS
Robert J. Laufer and Metro D. Kulik, Pittsburgh, Pa., assignors, by mesne assignments, to Consolidation Coal Company, a corporation of Delaware
No Drawing. Filed July 28, 1965, Ser. No. 475,587
4 Claims. (Cl. 260—624)

ABSTRACT OF THE DISCLOSURE

The transbutylation of 2,4 - di - tert - butylphenol and of 2,4,6 - tri - tert - butylphenol in the presence of unsubstituted phenol under conditions such that ortho-substitution rather than para-substitution of the unsubstituted phenol is obtained.

This invention relates to the transalkylation of certain poly - tert - butylphenols, and more particularly, to the transalkylation of 2,4,6 - tri - tert - butylphenol and 2,4-di- tert - butylphenol, separately or in admixture.

The tert - butylphenols are generally useful either as antioxidants for oxygen sensitive organic compositions such as rubber and lubricating oils, or as intermediates in the manufacture of such antioxidants. As might be expected, however, they differ sufficiently in their antioxidant properties to make some in greater demand than others. Accordingly, it would be desirable to be able to convert one to the other as the need arose. It is relatively simple to add butyl groups in controllable fashion, both as to number and location. However, the converse is not necessarily true. For example, it has not hitherto been commercially feasible to convert poly-butylated phenols to ortho - butylated phenol. In particular, it has not been commercially feasible to convert either 2,4 - di - tert-butylphenol or 2,4,6 - tri - tert - butylphenol preferentially to 2 - tert - butylphenol, that is, to 2 - tert - butylphenol rather than to 1-tert-butylphenol.

In accordance with our invention, we have provided a process for converting a tert-butylphenol selected from the class consisting of 2,4-di-tert-butylphenol, 2,4,6-tri-tert-butylphenol, and mixtures thereof to 2 - tert - butylphenol. The process comprises reacting the selected tert-butylphenol with phenol itself at a temperature between 75 and 150° C. in the presence of a small amount of concentrated sulfuric acid. The amount of sulfuric acid present must be small, less than 0.5 percent by weight of the selected butylphenol or butylphenols, as the case may be. If this amount is exceeded, then 4-tert-butylphenol is produced in preference to the desired 2-tert-butylphenol.

In the catalytic transalkylation of either 2,4-di-tert-butylphenol or 2,4,6 - tri - tert - butylphenol in the presence of phenol, the migratable butyl groups are those in the 2- and 6-positions, that is, ortho to the hydroxyl. The butyl group in the 4-or para-position in the most stable and requires debutylating conditions to dislodge it. In prior work, the catalytic transalkylation of butylated phenols has resulted in the migratable ortho-butyl groups transferring principally to the 4- or para-postion of the phenol, thus increasing preferentially the amount of 4-butylphenol. By the practice of the present invention, the transfer of tthe migratable groups to the ortho-position of the phenol is favored. However, it must be remembered that the product will contain at least an equimolar amount of a 4 - butyl - substituted phenol since the butyl group in the para-position is not affected by the conditions of the reaction.

For a better understanding of our invention, its objects and advantages, reference should be had to the following examples:

EXAMPLE 1

Transalkylation of 2,4-di-tert-butylphenol

The reaction was carried out in a 500 ml. flask provided with a thermometer, stirrer, reflux condenser with "Drierite" drying tube and a heating mantle. The 2,4-di-tert-butylphenol (98.9% purity) and the phenol (U.S.P. synthetic, redistilled) were charged into the flask. As in the other examples, the amount of phenol employed was in excess of that required to pick up all the ortho-substituted butyl groups present on the butylated phenol. The exact amount is given in the composition of the feed in Table I below. The flask contents were stirred and heated to 90° C. A sample of about 0.5 ml. was withdrawn with a pipette for gas chromatography analysis (Sample No. 1, Table I). Then, 0.21 gm. of 96–98% sulfuric acid was added. The reaction was allowed to proceed at 90° C. and a 0.5 ml. sample of the flask contents was taken at intervals of time (as shown in Table I). The sample was neutralized with a small amount of moist $NaHCO_3$ and analyzed by gas chromatography for product distribution. The distribution of the products in weight percent is shown in Table I.

TABLE I.—TRANSALKYLATION OF 2,4-DI TERT-BUTYLPHENOL

| Sample No. | Reaction time, hours | Phenol | 2-t-butylphenol | 4-t-butylphenol | 2,6-di-t-butylphenol | 2,4-di-t-butylphenol | 2,4,6-tri-t-butylphenol |
|---|---|---|---|---|---|---|---|
| 1 (feed) | 0.0 | 50.4 | 0.0 | 0.2 | 0.3 | 49.1 | 0.0 |
| 2 | 0.5 | 50.1 | 2.6 | 5.1 | 0.2 | 41.1 | 0.9 |
| 3 | 1.5 | 47.5 | 5.0 | 10.9 | 0.4 | 35.4 | 0.8 |
| 4 | 3.5 | | | | | | |
| 5 | 5.0 | 43.3 | 7.7 | 19.6 | Tr. | 29.1 | 0.3 |

EXAMPLE 2

Transalkylation of 2,4,6-tri-tert-butylphenol

The apparatus used was the same described in the preceding experiment. The 2,4,6 - tri - tert-butylphenol (99.2% purity) and the phenol (U.S.P. synthetic, redistilled) were charged into the flask. The flask contents were stirred and heated to 90° C. and 0.26 gm. of concentrated (96–98%) $H_2SO_4$ was added from a syringe. Samples were taken at intervals of time and analyzed by gas chromatography. The product distribution in weight percent at the different intervals is shown in Table II below:

TABLE II.—TRANSALKYLATION OF 2,4,6-TRI-TERT-BUTYLPHENOL

| Sample No. | Reaction time, hours | Phenol | 2-t-butylphenol | 4-t-butylphenol | 2,6-di-t-butylphenol | 2,4-di-t-butylphenol | 2,4,6-tri-t-butylphenol |
|---|---|---|---|---|---|---|---|
| 1 (feed) | 0.0 | 46.6 | 0.0 | 0 0 | 0.0 | 0.4 | 53.0 |
| 2 | 0.5 | 36.7 | 9.9 | 3.0 | 1.0 | 22.5 | 26.9 |
| 3 | 1.5 | 31.6 | 14.8 | 3.0 | 1.7 | 36.5 | 12.4 |
| 4 | 3.5 | 29.4 | 17.1 | 4.8 | 2.0 | 42.0 | 4.7 |
| 5 | 5.0 | 27.4 | 18.2 | 5.6 | 1.5 | 43.9 | 3.4 |

EXAMPLE 3

Transalkylation of mixtures of 2,4-di-tert-butylphenol and 2,4,6-tri-tert-butylphenol A synthetic mixture of 2,4-di-tert-butylphenol and 2,4,6-tri-tert-butylphenol was reacted with phenol in a three-liter, 3-necked flask provided with a stirrer, reflux condenser, thermometer, and drying tube. The composition of the synthetic mixture is given below in Table III. The conditions and product distribution are given in Table IV.

TABLE III.—Composition of synthetic mixture

| Component: | Percent by weight |
|---|---|
| 2-tert-butylphenol | 0.0 |
| 4-tert-butylphenol | 0.2 |
| 2,6-di-tert-butylphenol | 2.7 |
| 2,4-di-tert-butylphenol | 39.3 |
| 2,4,6-tri-tert-butylphenol | 57.8 |
| High boilers | 0.0 |

TABLE IV.—Conditions and product distribution

| Conditions: | |
|---|---|
| Catalyst (98%) | $H_2SO_4$ |
| Catalyst, wt. percent [1] | 0.17 |
| Temperature, ° C. | 90 |
| Reaction time, hrs. | 3.0 |
| Phenol, wt. percent [1] | 42.0 |
| Product distribution: | |
| Phenol | 18.7 |
| 2-tert-butylphenol | 16.4 |
| 4-tert-butylphenol | 5.5 |
| 2,6-di-tert-butylphenol | 1.2 |
| 2,4-di-tert-butylphenol | 53.4 |
| 2,4,6-tri-tert-butylphenol | 4.8 |

[1] Based on charge of mixture of 2,4-di-tert-butylphenol and 2,4,6-tri-tert-butylphenol in the synthetic mixture.

According to the provisions of the patent statutes, we have explained the principle, preferred construction, and mode of operation of our invention and have illustrated and described what we now consider to represent its best embodiment. However, we desire to have it understood that, within the scope of the appended claims, the invention may be practiced otherwise than as specifically illustrated and described.

We claim:

1. A process for transalkylation of a poly-tert-butylphenol selected from the class consisting of 2,4-di-tert-butylphenol and 2,4,6-tri-tert-butylphenol which comprises heating said poly-tert-butylphenol with unsubstituted phenol at a temperature between 75 and 150° C. in the presence of concentrated sulfuric acid, the amount of the sulfuric acid being less than 0.5 percent by weight of the selected butylphenols present, whereby said unsubstituted phenol is preferentially converted to 2-tert-butylphenol.

2. A process according to claim 1 in which the selected butylphenol is 2,4-di-tert-butylphenol.

3. A process according to claim 1 in which the selected butylphenol is 2,4,6-tri-tert-butylphenol.

4. A process according to claim 1 in which the selected butylphenol is a mixture of 2,4,6-tri-tert-butylphenol and 2,4-di-tert-butylphenol.

References Cited

UNITED STATES PATENTS

| 1,972,599 | 9/1934 | Perkins et al. | 260—624 |
| 2,189,805 | 2/1940 | Kyrides et al. | 260—624 |
| 2,553,538 | 5/1957 | Arnold | 260—624 |

LEON ZITVER, *Primary Examiner.*

W. B. LONE, *Assistant Examiner.*